United States Patent

[11] 3,610,714

| [72] | Inventor | Albert M. De Gaeta<br>133 84th St., Brooklyn, N.Y. 11209 |
|---|---|---|
| [21] | Appl. No. | 180 |
| [22] | Filed | Jan. 2, 1970 |
| [45] | Patented | Oct. 5, 1971<br>Continuation-in-part of application Ser. No. 759,560, Sept. 13, 1968. |

[54] BALL BEARING
14 Claims, 6 Drawing Figs.

[52] U.S. Cl. ..................................... 308/193,
308/174
[51] Int. Cl. ..................................... F16c 33/00,
F16c 19/04
[50] Field of Search ........................... 308/174,
189, 178, 230

[56] References Cited
UNITED STATES PATENTS
| 2,334,002 | 11/1943 | Haintz | 308/174 |
| 2,969,265 | 1/1961 | Jones | 308/194 |

*Primary Examiner*—Martin P. Schwadron
*Assistant Examiner*—Frank Susko
*Attorneys*—Robert E. Burns and Emmanuel J. Lobato ABSTRACT: A precision ball bearing having very low static friction comprises a full complement of balls between an outer race having a cylindrical inner surface and an inner race having a cylindrical outer surface. The balls are retained in a circular series by two end plates. The races ad balls are round to a high accuracy and have a high modulus of elasticity, preferably of the order of 100 million pounds per square inch.

PATENTED OCT 5 1971

3,610,714

BALL BEARING

This application is a continuation-in-part of my application Ser. No. 759,560 filed Sept. 13, 1968.

The invention relates to precision ball bearings having extremely low static friction characteristics.

For applications such as gyroscopes and inertial guidance systems, it is necessary to support the gyroscopic or inertial guidance element by bearings which eliminate so far as possible the effect of friction. Jewel bearings are used in such applications but are subject to the disadvantages that they have low load-carrying ability and do not reduce friction as much as is desirable. Moreover, they are easily damaged by thermal or mechanical shock.

While ball and roller bearings are commonly referred to as "antifriction" bearings, the friction, and in particular the static friction, of ball and roller bearings of conventional design is too high to adapt such bearings for use in gyroscopes or other apparatus where extremely low friction is required.

It is an object of the present invention to provide ball bearings having such low friction characteristics, and particularly low static friction, as to make them eminently suitable for use in precision instruments such as gyroscopes and inertial guidance systems. In instruments of this kind, the rotatable parts are normally stationary and when movement does occur, it is ordinarily of small angular extent. Hence, the static friction of the bearings used is of particular importance. In accordance with the present invention, it is possible to provide bearings having a static friction of the order of 0.07 to 0.01 dyne cm.

In comparison with jewel bearings, the ball bearings in accordance with the present invention have the important advantages that they have the capacity of carrying higher loads with a low friction level.

The invention will be more fully understood from the following description of preferred embodiments of the invention illustrated by way of example in the accompanying drawings in which.

Figure 1:
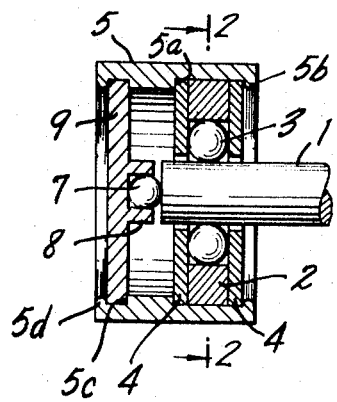
FIG. 1 is a side view partly in axial section showing a ball bearing in accordance with the invention.
Figure 2:
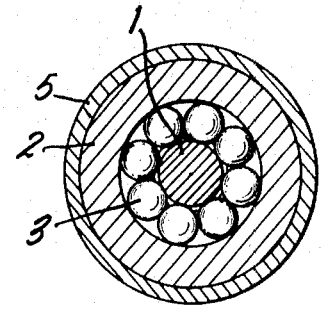
FIG. 2 is a cross section taken approximately on the line 2—2 in FIG. 1.

The bearing shown in FIGS. 1 and 2 comprises an inner bearing member, an outer bearing member concentric with and spaced from the inner bearing member, a plurality of balls between the inner and outer bearing members and means for retaining the balls in an axial direction. The inner bearing member is shown as a shaft 1 and the outer bearing member is shown as a ring 2 with a full complement of balls 3 between the inner and outer bearing members. The means for retaining the balls in an axial direction is illustrated as end plates in the form of discs 4 located at opposite ends of the outer bearing member 2 and having central holes to receive the shaft 1. The ring 2 and discs 4 are held in a suitable housing which is shown as an annular casing 5 having a shoulder 5a against which one of the discs 4 seats and the lip 5b turned inwardly to engage the outer face of the other disc.

A contributing factor in the low friction characteristics of bearings in accordance with the present invention is the high precision with which the bearing parts are made. The outer surface of the inner bearing member and the inner surface of the outer bearing member are precisely round within a tolerance of the order of 10 millionths of an inch, the tolerance being measured as the difference between minimum and maximum radii measured from a fixed center to be bearing surface at different locations around the bearing members. The balls are precisely spherical to a tolerance of the order of 1 millionth of an inch, the tolerance being the difference between minimum and maximum radii measured from a fixed center to different points on the surface of the ball. The surface finish of the balls, races and end plates is better than 2 microinches R.M.S.

As will be seen in FIG. 2, there is a full complement of balls between the inner and outer bearing members, successive balls touching one another. There is no ball retainer or cage such as is commonly used in ball and roller bearings. The diameter of the balls is related to the inner diameter of the ring 2 and the outer diameter of the shaft 1 so that the balls can turn freely but the cumulative clearance between the balls in a circumferential direction does not exceed a value of the order of 2 ten-thousandths of an inch. With a clearance of this order of magnitude the maximum radial movement of the shaft relative to the ring 2 is of the order of 25 to 50 millionths of an inch.

The dimensions of a ball bearing in accordance with the present invention are illustrated by the following example:

| | |
|---|---|
| outer diameter of outer race | 0.156" |
| inner diameter of outer race | 0.0961" |
| roundness of inner surface | 0.00001" |
| roundness of shaft, better than | 0.00001" |
| diameter of shaft | 0.0425" |
| diameter of balls | 0.0266" |
| tolerance in ball diameter | 0.000001" |
| roundness of balls, better than | 0.0000005" |

In the examples shown in FIG. another the spacing of the end plates 4 from one another is determined by the axial dimension of the ring 2. This dimension should be slightly greater than the diameter of the balls so that the end plates do not impede the free movement of the balls in a circumferential direction but retain the balls in circular alignment with one another.

A further factor in reducing the friction of of the ball bearing is the nature of the materials of which the ball bearing components are made. The balls and races must be formed of strong durable material which can be formed accurately as indicated above. Moreover, in order to obtain low-friction values the material of the balls and races must have a high modulus of elasticity. It has been found that for satisfactory results the modulus of elasticity of he material of which the balls and races are formed should have a value at least of the order of 60 million p.s.i. and preferably greater than 90 million p.s.i. A satisfactory material has been found to be tungsten carbide having a modulus of elasticity of the order of 100 million p.s.i. and a compressive strength of the order of 700,000 to 1 million p.s.i.

The end plates 4 do not need to have quite as high a modulus of elasticity of the races and balls but should preferably have a low coefficient of sliding friction. A satisfactory material for the end plates has been found to be sapphire or corundum having a modulus of elasticity of the order of 60 million to 70 million p.s.i. and a compressive strength of about 300,000 p.s.i. The weight of the sapphire or corundum material is about one-fourth of that of tungsten carbide and the material has the further desirable characteristic that in the thickness used, it is transparent so as to permit inspection of the balls after the bearing has been assembled.

Figure 3:
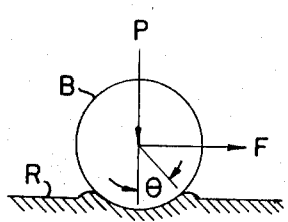
FIG. 3 is a schematic view illustrating the forces acting on a ball rolling on a raceway.

The importance of forming the balls and races of material having a high modulus of elasticity is illustrated in FIG. 3, which shows schematically a ball B pressed against a raceway R by a load P. As illustrated in an exaggerated manner in FIG. 3, the pressure P causes the ball to be pressed into and thereby indent the surface of the raceway R by elastic deformation. Moreover, the surface of the ball engaging the raceway is somewhat flattened. In order to roll along the raceway surface, the ball must in effect roll out of a depression. This is equivalent to the ball rolling up an inclined plane having an angle $\theta$. The relation is given by the equation:

$$Fr \cos \theta = Pr \sin \theta$$

where
- $F$ = frictional resistance in pounds
- $P$ = normal force in pounds
- $R$ = radius of ball in inches.

The force $F$ required to roll the ball along the surface thus depends on the pressure $P$ and on the modulus of elasticity of the material. The relationship is given by the formula:

where $$P_{max} = 0.388 \sqrt[3]{\frac{FE^2}{r^2}}$$

- $P_{max}$ = maximum unit pressure in pounds per square inch
- $E$ = modulus of elasticity in pounds per square inch
- $r$ = radius in inches
- $F$ = applied load in pounds.

From the foregoing equation it will be seen that with a high modulus of elasticity the value $F$—which represents the force required to roll the ball along the raceway surface—is less.

The number of balls used in the ball bearing can be varied according to the dimensions of the bearing and the surface requirements. In order to hold the shaft at all times precisely centered, the number of balls should not ordinarily be less than six. With the diameter of the outer race held constant, it has been found that the friction of the bearing can be decreased by increasing the number of balls. The upper limit is determined by the diameter of the balls which necessarily decreases as the number of balls increases. From the point of view of manufacture, it has not been found desirable to use balls having a diameter less than about 0.01 inch.

The annular casing 5 is formed of a material having a lower modulus of elasticity than that of the races, for example a modulus not exceeding 30 million p.s.i. For example, suitable materials are brass having a modulus of elasticity of about 12 to 20 million p.s.i. and aluminum having a modulus of elasticity of about 10 million. The inner diameter of the casing—before assembly—is slightly less than the outer diameter of the outer race so that the outer race is assembled in the casing with a press fit to assure that it is held firmly without play. The outer diameter of the discs 4 is slightly less than that of the outer race, for example 0.001 inch less, so that they do not interfere with the secure holding of the outer race by the casing. When the lip of bead 5b is formed—after the discs 4, outer race 2 and balls 3 have been assembled in the casing—it presses axially on the assembly so as to clamp one disc 4 firmly between the outer race 2 and the shoulder 5a of the casing and the other disc 4 firmly between the outer race 2 and the bead 5b. The discs 4 are thereby held fixedly in the assembly. The radial thickness of the annular casing 5 is sufficient to provide adequate strength but low enough to assure that the ring stiffness of the casing is much less than that of the outer race 2 so that when the outer race is assembled in the casing with an interference fit the outer race is not distorted by the casing. As the modulus of elasticity of the casing material is also a factor in ring stiffness, the radial thickness of the casing preferably varies inversely with the modulus of elasticity. For example, the wall thickness of a brass casing in the example given above is of the order of 0.004 to 0.005 inches. If the casing is made of aluminum having a modulus of elasticity of about 10 million p.s.i., the wall thickness can be proportionally greater whereas if the casing is made of stainless steel having a modulus of elasticity of about 30 million, the wall thickness of the casing is correspondingly less.

The bearing shown in FIG. 1 is illustrated as including a thrust bearing which may or may not be used as desired according to whether there are thrust loads on the shaft. The thrust bearing is shown as comprising a single ball 7 which engages the end of the shaft and is held in centered position by a cup portion 8 of an end plate 9. The plate 9 seats on a shoulder 5c of the annular casing 5 and is fixedly retained by a lip portion 5d.

Figure 4:
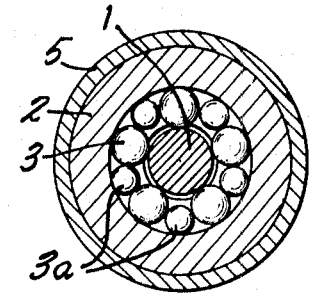
FIG. 4 is a cross-sectional view similar to FIG. 2 but illustrating a modification.

In FIG. 4 there is shown a bearing similar to that of FIGS. 1 and 2, corresponding parts being designated by the same reference numerals. The bearing shown in FIG. 4 differ from that of FIG. 2 in that alternate balls 3 are of slightly larger diameter than intervening balls 3a. The larger balls 3 constitute load-carrying balls and have the characteristics which have been described. The intervening balls 3a are slightly smaller and constitute spacing balls. The difference in size has been exaggerated in FIG. 4 so as to be more readily visible. Preferably the balls 3a are only sufficiently smaller than the balls 3 so that they do not carry load. Since the balls 3a are not load-carrying balls, they do not need to have as high a modulus of elasticity as the balls 3. On the other hand, it is desirable for them to have a low coefficient of friction. Accordingly, the ball 3a may be formed of ruby or sapphire material having a compressive strength of about 300,000 p.s.i.

Figure 5:
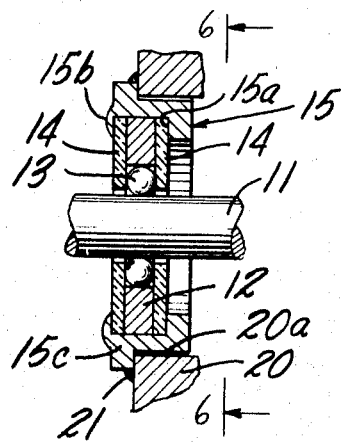
FIG. 5 is a side view partly in axial section of another bearing in accordance with the invention.
Figure 6:
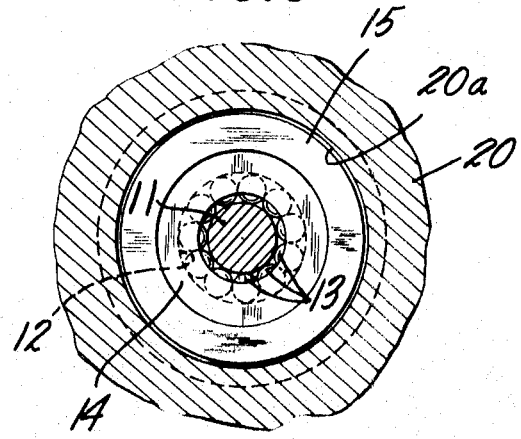
FIG. 6 is a cross-sectional view taken approximately on the line 6—6 in FIG. 5.

In FIGS. 5 and 6, there is shown another example of a bearing in accordance with the present invention. The bearing has an inner race in the form of a shaft 11 and an outer race shown as a ring 12. A full circular complement of balls 13 is disposed between the inner and outer races. The balls 13 are retained in an axial direction by annular end plates 14 which are spaced from one another by the outer bearing ring 12. The ring 12, balls 13 and end plates 14 are held in assembled relationship in an annular casing 15 in which they are clamped between an inwardly extending flange 15a and an inturned lip or bead 15b. At one end, for example the end adjacent the bead 15b, the casing 15 is provided with an outwardly projecting flange 15c for positioning the bearing in an axial direction when mounted in an opening on a support 20, as seen in FIG. 5.

As in the embodiment illustrated in FIGS. 1 and 2, the inner race 11, outer race 12 and balls 13 are of a hard material having a modulus of elasticity of at least 60 million p.s.i. and preferably of the order of 100 million p.s.i. A suitable material is tungsten carbide having a modulus of elasticity of the order of 100 million p.s.i. and a compressive strength of the order of 700,000 to 1 million p.s.i. The end plates 14 should also be of a hard material having a modulus of elasticity of at least 60 million p.s.i. but do not necessarily need to have as high a modulus of elasticity as the balls and bearing races. On the other hand, it is desirable for the end plates 14 to have a low coefficient of friction. A satisfactory material for the end plates has been found to be sapphire or corundum having a modulus Of elasticity of 60 million to 70 million p.s.i. and a compressive strength of about 300,000 p.s.i. Such material has the additional advantage of being transparent in the thickness used so as to permit inspection of the balls after the bearing has been assembled.

In this embodiment shown in FIGS. 5 and 6, as in those of FIGS. 1, 2 and 4, the inner and outer races are precisely cylindrical, the balls are precisely spherical and of a precise diameter and the end plates are precisely flat, all with an accuracy measured in millionths of an inch. For example, in a bearing having a shaft diameter of 0.0225 inch, the accuracy of the parts is held within the following tolerances:

| | |
|---|---|
| Maximum variance in roundness of the outer race: | 0.00001" |
| Maximum variance in roundness of shaft: | 0.00001" |
| Maximum variation in the size of the balls: | 0.0000005 |
| Maximum variance in roundness of the balls: | 0.000005" |
| Maximum radial play: | 0.00002" |

Moreover, the axial dimension of the outer race 12 is held to close tolerances so that the end plates are spaced apart from one another a distance which permits the balls to roll freely between the inner and outer races while holding them in circular alignment. The spacing between the end plates exceeds the ball diameter by not more than 0.001 inch. The ends of the outer race 12 are lapped flat and parallel and the end plates 14 are lapped flat to assure that the spacing is uniform.

The annular casing 15 is made of a material, for example brass, having a modulus of elasticity which is less than half that of the balls and races. Moreover, the wall thickness of the casing in a radial direction is less than the thickness in a radial direction of the outer bearing rig 12. Hence, when the bearing ring 12 is assembled in the casing with an interference fit, the ring is held firmly without being distorted out of round by the casing. The end plates 14 have an outer diameter which is less than that of the ring 12, for example by 0.001 inches, so that they do not interfere with the interference fit between the ring 12 and the casing.

The bearing is assembled by placing one of the end plates 14 in the casing against the inwardly projecting flange 15a, pressing the outer ring 12 into the casing tightly against the plate 14, inserting a full complement of balls inside the ring 12, placing the second end plate in the casing and turning down the bead or rim 15b so as to grip the assembled ring and end plates between the bead and the flange 15a. As the balls are touching one another, they cannot move inwardly and hence are retained in the bearing without the shaft 11 which may be inserted later when the bearing is assembled in the instrument or apparatus in which it is used.

In FIGS. 5 and 6, the bearing is shown mounted in a circular hole 20a of a support member 20b which may, for example, be a portion of the frame or housing of the apparatus. The hole 20a in the support 20 is sufficiently larger than the outer diameter of the casing so that the casing can be inserted freely in the hole without any pressure that might distort the casing and thereby distort the outer race 12 of the bearing. The casing is positioned axially relative to the support 20 by the outwardly projecting flange 15c and is suitably fixed in place, for example with epoxy adhesive, in such manner as to avoid forces that might distort the bearing components and disturb the close tolerances indicated above.

While the embodiment of FIGS. 5 and 6 has been shown as a pure radial bearing without any provision for taking thrust loads on the shaft, it will be understood that an associated thrust bearing can, if desired, be supplied, for example as illustrated in FIG. 1.

It will be noted that in the illustrated embodiments of the invention, the balls are held in alignment without the use of cages or similar devices such as are commonly used in ball and roller bearings. Such cages are disadvantageous in bearing where low friction is required since friction unavoidably occurs between the balls and cage.

While preferred embodiments of the invention have been illustrated by way of example in the drawings and are herein particularly described, it will be understood that, except as otherwise indicated, the features and characteristics of the several embodiments are interchangeable and that modifications may be made in details of construction.

What I claim is:

1. A precision ball bearing having low static friction comprising a cylindrical inner race, an annular outer race surrounding said inner race and having planar end faces perpendicular to the axis of said outer race and a cylindrical inner surface with a radius larger than the outside radius of said inner race to provide an annular space between said races, a full complement of balls between said races, two end plates abutting respectively the opposite end faces of said outer race and retaining said balls in circular alignment, and an annular casing surrounding said outer race and end plates and having inturned portions engaging said end plates to secure said outer race, balls and end plates in assembled relation to form a unit suitable for mounting in a support, said balls and the bearing surfaces of both of said races being precisely round and said balls and both races having a modulus of elasticity at least of the order of 60 million p.s.i., and said casing having a modulus of elasticity less than half that of said balls and races and a wall thickness in a radial direction less than the radial thickness of said outer race, whereby the roundness of said outer race is not distorted by assembly in said casing.

2. A precision ball bearing according to claim 1, in which said races and balls have a modulus of elasticity at least of the order of 90 million p.s.i.

3. A precision ball bearing according to claim 1, in which the maximum variation in roundness of the balls is 1 millionth of an inch.

4. A precision ball bearing according to claim 1, in which the maximum variation in size of the balls is 1 millionth of an inch.

5. A precision ball bearing according to claim 1, in which the maximum variation in roundness of said races is one hundred-thousandth of an inch.

6. A precision ball bearing according to claim 1, in which the maximum radial play in the assembled bearing is 20 millionths of an inch.

7. A precision ball bearing according to claim 1, in which said end plates have a modulus of elasticity at least of the order of 60 million p.s.i.

8. A precision ball bearing according to claim 7, in which said end plates have a lower coefficient of sliding friction than said races.

9. A precision ball bearing according to claim 8, in which said end plates are transparent.

10. A precision ball bearing according to claim 1, in which said outer race fits in said casing with an interference fit and said end plates fit in said casing freely and are held fixed by being clamped between the end faces of said outer race and said inturned portions of said casing.

11. A precision ball bearing according to claim 1, in which alternate ones of said balls are slightly larger than intervening balls and constitute load-carrying balls, said intervening balls being spacing balls.

12. A precision ball bearing according to claim 11, in which said intervening balls have a lower coefficient of sliding friction than said alternate balls.

13. A precision ball bearing according to claim 1, in which said inner race is a shaft having a square end face, said bearing further comprising a single ball engaging said end face of said shaft and means in said casing rotatably supporting said single ball centrally of said shaft.

14. A precision ball bearing according to claim 1, in which said casing has a modulus of elasticity not exceeding 20 million p.s.i.